United States Patent Office

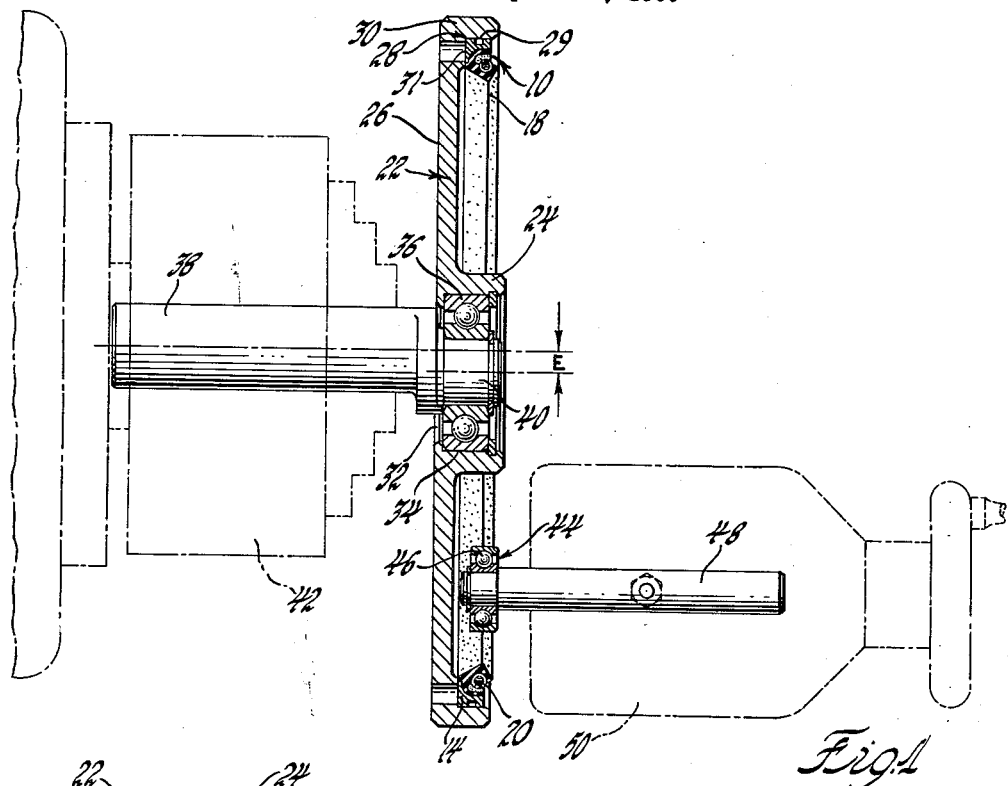

3,104,463
Patented Sept. 24, 1963

3,104,463
METHOD OF AND APPARATUS FOR EQUALIZING SEAL SPRING FORCES
Robert L. Dega, Utica, Mich., assignor to General Motors Corporation, Detroit, Mich., a corporation of Delaware
Filed Apr. 22, 1960, Ser. No. 24,130
9 Claims. (Cl. 29—450)

This invention relates to improvements in methods of and apparatus for manufacturing annular seals.

Annular sealing members associated with rotatable shafts have wide industrial application. The sealing members are usually in the form of a ring having a portion adapted to be fixedly secured to a support member and having an integral flexible lip portion adapted for wiping engagement with a rotating shaft or other cylindrical member. In order to provide a tight seal about the periphery of a rotating shaft, a spring member is integrally associated with the lip portion to maintain a forceful engagement between the sealing lip and the shaft. I have discovered that the sealing ability of an annular seal of this type is greatly increased by the provision of spring members that produce equal radially directed force components about the periphery of the lip portion in assembled position sealingly surrounding a shaft. A critical function of the spring member is to apply uniform radial force through the flexible lip of the seal against the rotating shaft throughout the life of the seal. Seals with uneven spring tension leak profusely. All of the known methods of assembling the spring member about the flexible lip of the seal result in a high degree of uneven spring tension. In addition to the affect of uneven spring tension on sealing ability, uneven spring tension also results in excessive seal wear due to the fact that the spring may brinnel into the flexible lip and create damaging high temperatures.

It is, therefore, an object of this invention to provide an improved method of manufacturing annular seal members. Another object of this invention is to provide manufacturing apparatus for insuring that spring components of annular seals are provided with equal radially directed force components in assembled position. It is a further object of this invention to provide a method of forming annular sealing members and increasing sealability by increasing the circularity of the spring members by circumflexion thereof in the finished seal after the spring assembly operation. Another object of this invention is to provide apparatus to circularize a spring member associated with a sealing lip and increase circularity of the sealing lip in assembled position.

Other objects and advantages of this invention will become apparent from the following detailed description and the accompanying drawings wherein:

FIGURE 1 is a side elevational view, partly in section of an illustrative preferred embodiment of the invention;

FIGURE 2 is a partial sectional view of a portion of the apparatus shown in FIGURE 1; and FIGURE 3 is a sectional view illustrating a seal in normal use.

Referring now to FIGURE 3, an annular seal member 10 of the type for which the subject apparatus is designed is shown in assembled position about a shaft member 12 in the usual manner. The seal member is conventional and comprises a body portion 14 that is fixedly secured in the central bore of a shaft housing member 16 and a flexible lip portion 18 that is held in wiping engagement with the shaft member 12 by an integral spring element 20 which exerts radially, inwardly directed force components around the sealing lip to insure sealing engagement. The spring member 20 is a conventional garter-type spring made from closely spaced wire convolutions and having the ends thereof suitably connected to form a spring annulus. The hereinafter disclosed apparatus is also adaptable for use with other types of seals and spring members.

In order to insure that the sealing lip is maintained in sealing engagement around the entire periphery of the shaft with which it is associated, the seal assembly is placed in special circularizing apparatus after assembly of the spring member and prior to final assembly about a shaft to increase circularity of the garter spring and increase radial force uniformity of the spring member forces directed radially inwardly against the sealing lip. As shown in FIGURE 1, a seal retainer 22 having a hub portion 24 and a radially extending flange portion 26 mounts the seal member 10 on an annular seat 28 provided by the inner peripheral surface 29 of a transversely extending rim portion 30 and an adjacent surface 31 of the flange portion 26 to provide a back-up surface during the circularizing operation. The hub 24 is provided with a central bore 32 and a counterbore 34 which seats the outer race of a bearing member 36. A drive shaft 38 is provided with an eccentric shaft extension 40 on which the inner race of the bearing member 36 is fixably secured. The eccentricity E of the extension 40 may be varied to obtain varying degrees of circumflexion of a flexible sealing lip and associated spring member in accordance with the particular design characteristics involved. An eccentricity of approximately 1/4 inch has been found to be satisfactory for a majority of seal designs. The eccentricity may be equal to or greater than the maximum radial flexure to which the sealing lip 18 will be subjected in use; that is, the eccentricity may be approximately equal to the radial difference between the unflexed or normal position of the sealing member and its maximum flexed position in association with a shaft for which it provides a seal. The shaft member is fixedly secured in a suitable chuck 42 associated with a rotating device such as a lathe head or the like. A tool 44 for depressing the flexible sealing lip 18 is provided in the form of a bearing member having a rotatable outer annulus 46 and is fixedly secured to a shaft 48 which is fixedly secured to an adjustable tool post 50 or other suitable device positioned closely adjacent the seal retainer 22. The shaft 48 is mounted approximately parallel to the drive shaft 38 and the eccentric extension 40 to provide an axis of rotation for the outer annulus 46 that is parallel to the axis of rotation of the seal member and the retaining member 22. The outer periphery of the outer annulus 46 of the bearing member 44 is positioned so that when the axis of rotation of the drive shaft, the central axis of the eccentric shaft and the axis of rotation of the annulus 46 are in the same plane, the rotatable outer annulus 46 is closely adjacent the inner surface of the flexible lip. Thus, as the seal retainer and the annular seal member are rotated on the drive shaft 38, the flexible sealing lip portion 18 will intermittently engage the annulus 46 and be forced radially outwardly a distance determined by the eccentricity E and the position of the annulus 46 as shown in FIGURE 2. Therefore, adjacent portions of the garter spring 20 will be sequentially depressed and flexed in a circular arc. The circularizing, spring tension equalizing action of the tool 44 is intensified by the ball bearing action as the seal retainer 22 is eccentrically rotated relative thereto. As the rotatable outer annulus 46 of the tool 44 momentarily engages the flexible lip portion 18 a rolling and deforming action occurs in a small arc of the seal and the rate of rotative movement of the retainer is impeded so that the retainer 22 spins about the ball bearing 36 to cause the flexible lip portion 18 to be thoroughly tooled and the spring substantially circularized.

In operation, an annular seal member is mounted in a correspondingly dimensioned seal retainer 22 that is rotatably secured to the eccentric extension 40 of the drive shaft 38. Then a spring-distorting tool is positioned adjacent the flexible lip portion 18 with the afore-described spacing so that, as the seal retainer is rotated, adjacent portions of the flexible sealing lip will be rapidly sequentially compressibly agitated. In a typical circularizing and force equalizing operation for a seal seven inches in diameter, the drive shaft 38 will be rotated at a speed of approximately 1,000 r.p.m. and the distorting tool will be held in engagement with the flexible sealing lip for a fraction of a minute. The coaction of the rotatable outer annulus 46 on the flexible lip portion 16 with the garter spring 20 causes circumflexion of the spring member and tends to uniformly space the convolutions thereof and equalize spring tension. The action of the rotatable deforming tool on the flexible lip portion 18 retards the movement of the seal retainer 22 relative to the bearing member 36 so that the eccentric drive causes an oscillatory motion of the flexible lip portion through a distance equal to twice the eccentricity. In this manner, the integral spring element is flexed at a multitude of indiscriminate points through variable radial distances about the entire periphery thereof. The rapid flexing movement imparted to the spring element tends to uniformly space the convolutions of the spring and cause the spring to be substantially circularized and have a circularity such that, when the annular seal member is seated circumjacent a shaft, the radially inwardly directed forces of the spring member are uniformly distributed about the periphery of the flexible lip portion.

It is comprehended that various changes and modifications in the details of construction and arrangement of the parts may be made within the scope of this invention as defined by the appended claims.

I claim:

1. A method of manufacture of annular lip type seals having flexible lip portions on which spring means are mounted in assembled position to exert a radially directed force thereon and comprising the steps of assembling spring means with a flexible lip portion of a lip type seal, mounting the assembled seal on a rotatable support, rotating the seal with said support, and applying a rolling circumflexing force successively to small arcuate portions of the circumference of the flexible lip as the seal is rotated to radially flex the spring means until it is substantially circularized through its periphery thereby tending to produce uniform radial force components on the lip.

2. A method of manufacture of a lip-type seal having a flexible lip portion and spring means associated with the periphery thereof and comprising the steps of assembling a spring means in working position relative to a seal, mounting the assembled seal on a retainer member, mounting the retainer member on an eccentric portion of a rotatable shaft, eccentrically rotating said retainer on said shaft, and applying a peripheral force to the spring means as said seal is rotated to radially flex the periphery of the spring until said spring is substantially circularized.

3. Apparatus for circumflexing a flexible lip and associated spring member of an annular seal and comprising retainer means to support said annular seal, eccentric drive means to eccentrically rotate said retainer means and said annular seal therewith, and circumflexing tool means being supported adjacent said annular seal for engagement with said flexible lip as said retainer means and said annular seal are rotated to variable radially depress circumflex said flexible lip and said spring member.

4. Apparatus for circumflexing a flexible lip and associated spring member of a seal and comprising retainer means to support said seal, circumflexing tool means being supported adjacent said seal for engagement with said flexible lip, drive means to rotatably engage said circumflexing tool means with said flexible lip throughout the length thereof, and said circumflexing tool means being variably positionable relative to said flexible lip during engagement therewith to variably circumflex said flexible lip and said spring member.

5. In apparatus of the class described, a seal retainer, an annular seat formed on said seal retainer to accommodate an annular seal member provided with a flexible lip portion having a spring member associated therewith, a drive shaft, an eccentric extension formed on one end of said drive shaft and rotatably connected to said seal retainer, a distortion tool rotatably supported adjacent the periphery of said flexible lip portion, said tool being spaced relative to said eccentric extension to provide spring distorting contact with said spring member, means to rotate said seal retainer relative to said tool, and means to vary the radial spacing between said tool and said annular lip seal as said seal retainer is rotated to apply a variable distorting force about the periphery of said spring whereby said spring is uniformly circularized.

6. Apparatus of the class described for circumflexing a spring member integrally peripherally associated with an annular sealing member having a flexible lip portion and comprising: a seal retainer, a hub portion formed on said seal retainer, a transverse rim portion radially outwardly spaced of said hub portion, a seal seat formed about the periphery of said rim portion, bearing means associated with said hub portion and rotatably supporting said seal retainer, a drive shaft, an eccentric extension of said drive shaft fixed to said bearing means and rotatably supporting said seal retainer, a rotatable tool fixedly positioned adjacent the periphery of said seal seat and spaced therefrom radially inwardly of said seat a distance equal to or greater than the unflexed depth of said seal member when the axes of rotation of said shaft, said seal retainer and said tool are aligned, said eccentric portion of said drive shaft being offset from the axis of rotation of said drive shaft a distance causing radial flexure of the spring member by engagement with said rotatable tool as said retainer is rotated, and power means associated with said drive shaft whereby said seal retainer may be eccentrically rotated to variably distort the flexible sealing lip of said seal member by rubbing engagement with the periphery of said rotatable tool.

7. Apparatus for circumflexing an annular spring member integrally associated with a radially inwardly extending flexible lip of an annular seal to be sealingly engaged with the periphery of an annular shaft means and comprising: a drive shaft, one end of said shaft being fixed to rotary means, the other end of said shaft having an eccentric extension, an inner bearing race fixedly associated with said eccentric extension, bearing means associated with said inner bearing race, an outer bearing race rotatably secured on said bearing means and being rotatable relative to said eccentric extension, a seal retainer fixedly secured to said outer bearing race, an annular rim provided on said seal retainer radially outwardly of said drive shaft, an inwardly facing transverse surface formed by said rim, an annular seal seat formed along said surface concentric to said eccentric extension and having a diameter approximately equal to the outside diameter of said annular seal to form a back-up ring therefor, a rotatable tool fixedly secured adjacent said annular seal seat and having a seal engaging surface spaced radially inwardly of said seal seat a distance approximately equal to or less than the unflexed width of said annular seal, power means associated with said drive shaft to eccentrically rotate said seal retainer relative to said tool so that the seal engaging surface of said tool randomly circumflexes the annular spring member of a flexible annular seal mounted on said seat to circularize and uniformly tension said spring member.

8. Apparatus of the class described for circumflexing a spring member integrally peripherally associated with an annular sealing member having a lip portion and comprising: seal support means, seal seat means formed on said support means, drive shaft means having an eccentric extension, bearing means rotatably mounting said seal support means on said eccentric extension, rotatable tool means fixably positioned adjacent the periphery of said seal seat means and spaced radially inwardly a distance equal to or greater than the unflexed depth of said seal member when the axes of rotation of said drive shaft means, said seal support means and said tool means are aligned, said eccentric extension of said drive shaft means being offset from the axis of rotation of said drive shaft means a distance causing radial flexure of the spring member of a sealing member mounted on said seal seat means by engagement with said rotatable tool means as said seal support means is rotated, and drive means associated with said drive shaft means whereby said seal support means may be eccentrically rotated to variably distort the flexible sealing lip and spring member of said seal member by rubbing engagement with the periphery of said rotatable tool means.

9. A method for circumflexing an annular spring member fixably associated with a radially inwardly extending flexible lip of an annular seal to be sealingly engaged with the periphery of an annular shaft means and comprising: the steps of mounting the annular seal on a seal seat formed on a rotatable retainer fixably secured to an eccentric extension of a drive shaft, engaging a rotatable tool fixably secured adjacent said annular seal seat and having a seal engaging surface spaced radially inwardly of said seal seat a distance approximately equal to or less than the unflexed width of said annular seal with said flexible lip of said seal, and eccentrically rotating said seal retainer relative to said tool so that the seal engaging surface of said tool randomly circumflexes the annular spring member of a flexible annular seal mounted on said seat to circularize and uniformly tension said spring member.

References Cited in the file of this patent

UNITED STATES PATENTS

| | | |
|---|---|---|
| 1,998,048 | Farr | Apr. 16, 1935 |
| 2,122,477 | Leonard | July 5, 1938 |
| 2,646,617 | Turoff | July 28, 1953 |
| 2,670,705 | Herrold | Mar. 2, 1954 |
| 2,924,007 | Wrightfield | Feb. 9, 1960 |